US011536832B2

(12) United States Patent
Sorber et al.

(10) Patent No.: US 11,536,832 B2
(45) Date of Patent: Dec. 27, 2022

(54) BATTERYLESS SENSOR FOR DETECTING OCCUPANCY AND ACTIVITY

(71) Applicant: Clemson University, Clemson, SC (US)

(72) Inventors: Jacob Sorber, Clemson, SC (US); Josiah D. Hester, Clemson, SC (US); Harsh Desai, Clemson, SC (US); Nicole Tobias, Clemson, SC (US); Arwa Alsubhi, Clemson, SC (US); Taylor Antonio Hardin, Clemson, SC (US); Calvin Moody, Clemson, SC (US)

(73) Assignee: Clemson University, Clemson, SC (US)

( * ) Notice: Subject to any disclaimer, the term of this patent is extended or adjusted under 35 U.S.C. 154(b) by 131 days.

(21) Appl. No.: 16/875,217

(22) Filed: May 15, 2020

(65) Prior Publication Data

US 2020/0386885 A1 Dec. 10, 2020

Related U.S. Application Data

(60) Provisional application No. 62/848,889, filed on May 16, 2019.

(51) Int. Cl.
*G01S 17/04* (2020.01)
*H02S 40/30* (2014.01)
(Continued)

(52) U.S. Cl.
CPC .............. *G01S 17/04* (2020.01); *H02S 40/30* (2014.12); *H04W 52/0254* (2013.01); *H05B 47/115* (2020.01)

(58) Field of Classification Search
CPC .... G01S 17/04; H02S 40/30; H04W 52/0254; H05B 47/115
See application file for complete search history.

(56) References Cited

U.S. PATENT DOCUMENTS 7,940,167 B2 5/2011 Steiner et al.
8,009,042 B2 8/2011 Steiner et al.
(Continued)

OTHER PUBLICATIONS

Duong, Paloma R., USF Scholarship: a digital repository @ Gleeson Library | Geschke Center, The University of San Francisco, Master's Projects and Capstones | Theses, Dissertations, Capstones and Projects p. 337, Spring May 20, 2016, 70 pages, San Francisco, CA.

(Continued)

*Primary Examiner* — Georgia Y Epps
*Assistant Examiner* — Don J Williams
(74) *Attorney, Agent, or Firm* — Kim and Lahey Law Firm, LLC; Douglas W. Kim

(57) ABSTRACT

This system is directed to a batteryless, self-powered sensor comprising: a microprocessor; a first and second solar panel in electronic communications with the microprocessor; a transceiver in communication with the microprocessor; and a set of computer readable instructions included in the microprocessor adapted for creating motion data including a direction and a speed of movement of object within a first sensing area and a second sensing area, transmitted the motion data to a remote location if sufficient power is provided by the first solar panel to actuate the transceiver and a number of data points in the motion data exceeds a pre-determined number of minimal data points, associating a reduction in power delivered from the first solar panel to the microprocessor with movement and associating an increase in power delivered from the first solar panel to the microprocessor with movement.

22 Claims, 7 Drawing Sheets

(51) Int. Cl.
*H04W 52/02* (2009.01)
*H05B 47/115* (2020.01)

(56) References Cited

U.S. PATENT DOCUMENTS

| | | |
|---|---|---|
| 8,228,184 B2 | 7/2012 | Blakeley et al. |
| 9,752,383 B2 | 9/2017 | Lundy et al. |
| 2013/0278146 A1* | 10/2013 | Wilsher ................ H05B 47/16 315/151 |

OTHER PUBLICATIONS

Cowin, Laurie, Smart building tech yields utility savings up to 18%, Brief Constructiondive, Jan. 3, 2018, 2 pages.

* cited by examiner

BATTERYLESS SENSOR FOR DETECTING OCCUPANCY AND ACTIVITY

RELATED APPLICATIONS

This application claims the benefit of U.S. Provisional Patent Application No. 62/848,889, filed May 16, 2019 which is incorporated by reference herein in its entirety.

STATEMENT REGARDING FEDERALLY SPONSORED RESEARCH

This invention was made with government support under R25 EB016589/PPN 2015000077 awarded by the National Science Foundation. The government has certain rights in the invention.

BACKGROUND OF THE INVENTION

1) Field of the Invention

This sensor uses light reflections to detect objects moving through spaces wherein the sensor also harvests power for use by the batteryless system.

2) Description of the Related Art

With an increased focus on sustainability, there are efforts to reduce the energy needs in many areas including buildings. Buildings are estimated to be responsible for 30% to 45% of the global energy demand, with over 60% of that energy use in heating, air conditions, and lighting. Within the United States, commercial buildings annually consume approximately 20 percent of all energy. Technological advancements within the last decade, such as the Internet of Things (IoT), have spawned "Smart Buildings," which use automated devices and processes to automatically control a building's operations, including heating, ventilation, air conditioning, lighting, security, and other systems. Smart buildings use sensors, actuators, and microchips to collect and manage data in accordance with a building's functions and services. The intelligent infrastructure helps owners, operators, and facility managers improve asset reliability and performance, thereby reducing energy use, optimizing utilization of space while minimizing the environmental impact. A recent study showed smart technologies allow office buildings to recover 18 percent in savings annually, followed by retail and hospitals at 14 percent and hotels at 8 percent. The study also showed smart buildings could increase worker productivity. Although these new technologies have dramatically reduced energy consumption in commercial buildings, many occupancy tracking devices used within these buildings are large, expensive for widespread deployment, and require routine maintenance. Most devices (e.g., infrared, ultrasound, cameras) require wired connections to provide power and connectivity to control systems or use batteries that must be replaced. In some cases, smart devices require building occupants to change behavior or structural modifications to the existing building systems, which can increase the cost of implementation. Hence, there is a demand for improved occupancy devices with low energy requirements that do not require batteries or wired connections for power and data transmission.

For example, standards have been created for rating energy efficiently and sustainably of a building such as the Leadership in Energy and Environmental Design (LEED) standard. One key component to reducing the power used by a building and reducing unnecessary power usage is to understand how objects and people move through the facility or building. Facilities and buildings that can respond in real-time to how objects and people move and interact with the facility or building can use energy more efficiently. Inefficient attempts to detect objects and individual's movement include UVA doorjamb sensors, cameras, and wearables; each of which has its disadvantages including high power needs, privacy concerns and lack of adoption and integration. Further, the energy required by these devices can be in the range of 1 to 10 mA.

Buildings are known for energy waste which can be up to 5% to 20% of total energy consumption due to unnecessary lighting and HVAC operations. Improving energy efficiency requires an understanding of how the building is used and how objects and people move through the building on a day-to-day basis. Existing sensors, including passive infrared and ultrasonic sensors, have high energy needs and are counterproductive when trying to reduce unnecessary energy usage in a building. Further, these traditional technologies require either access to wired power or batteries. Running wired power to a large number of sensors is expensive and can require modifications to the building structure itself, especially when retrofitting old buildings. Batteries are expensive and have high maintenance as they need to be frequently replaced.

For example, U.S. Pat. No. 8,009,042 discloses a load control system that controls an electrical load provided in a space and comprises a load control device and one or more occupancy sensors. The load control device controls the load in response to the wireless control signals received from the occupancy sensors. Each occupancy sensor transmits an occupied control signal to the load control device in response to detecting an occupancy condition in the space and a vacant control signal to the load control device in response to detecting a vacancy condition. The load control device turns on the load in response to receiving the occupied control signal from at least one of the occupancy sensors and turns off the load in response to receiving vacant control signals from both of the occupancy sensors. The load control device is operable to determine that no wireless control signals have been received from the occupancy sensors for the length of a predetermined timeout period and to subsequently turn off the load. In this reference, the occupancy sensor is integrated into a switch that is wired in the electrical circuit of the load (e.g. light switch and light).

U.S. Pat. No. 8,228,184 discloses a load control system comprises a load control device and a battery-powered occupancy sensor, which transmits a first wireless signal to the load control device in response to detecting the presence of an occupant in a space. The load control system further comprises a visual indicator for providing a visual indication when the magnitude of a battery voltage of the occupancy sensor has dropped below a predetermined low-battery voltage threshold. The occupancy sensor may comprise the visual indicator, such that the visual indicator is illuminated when the occupancy detects the presence of the occupant in the space and the magnitude of the battery voltage is less than the predetermined threshold. Alternatively, the load control device may comprise the visual indicator, such that the visual indicator is illuminated in response to receiving a second wireless signal, which is transmitted by the occupancy sensor when the magnitude of the battery voltage is less than the predetermined threshold. This reference is battery powered. U.S. Pat. No. 7,940,167 is also a battery powered occupancy sensor.

U.S. Pat. No. 9,752,383 is directed to a motorized window treatment system which controls a plurality of motorized window treatments to maximize daylight autonomy, while minimizing cognitive dissonance. The system may include motorized window treatments, window sensors and involves a complex powered wiring system and configuration for its operation. It would be advantageous for an object detection and monitoring system to exist that did not require additional power, was lower in complexity and little or no maintenance.

Therefore, it is an object of the present system to provide for a sensor for detecting motion and movement of objects without the need for wired power or batteries.

It is another object of the present invention to provide for a sensor for detecting motion and movement of objects that is smaller, easier to install, low maintenance and has longevity.

BRIEF SUMMARY OF THE INVENTION

The system is directed to a batteryless, self-powered sensor comprising: housing attached to a support surface; a microprocessor included in the housing; a first solar panel in electronic communications with the microprocessor adapted to provide power to the microprocessor; a capacitor in communication with the microprocessor for storing energy received from the first solar panel; a second solar panel in communication with the microprocessor; a transceiver in communication with the microprocessor; and a set of computer readable instructions included in the microprocessor adapted for creating motion data including a direction and a speed of movement of an object within a first sensing area associated with the first solar panel and a second sensing area associated with the second solar panel, transmitted the motion data to a remote location if sufficient power is provided by the first solar panel or harvested by the solar array or otherwise available to power to actuate the transceiver, and a number of data points exceeds a pre-determined number of minimal data points, monitoring at least the first solar panel for energy output and associating power detected from the first solar panel with movement using the microprocessor to determine if movement is present.

The set of computer readable instructions can include instructions for normalizing movement data received from the first solar panel and the second solar panel and determining a baseline for an ambient condition of the first solar panel and the second solar panel. The set of computer readable instructions can include instructions to determining movement within the first sensing area associated with the first solar panel and a second sensor area associated with the second solar panel when compared to the baseline. The set of computer readable instructions can include instructions to associate movement of an object in the first sensing area when energy produced by the first solar panel is reduced. The solar panels of the solar array can include one or more photovoltaic cells.

The set of computer readable instructions can include instructions for determining a direction of movement of the object relative to the first solar panel and the second solar panel. The set of computer readable instructions can include instructions for determining a speed of movement of the object. The set of computer readable instructions can include instructions for determining if sufficient power is provided by the first solar panel to actuate the transceiver. A non-volatile memory can be included and in communications with the microprocessor for storing data received from the first solar panel and the second solar panel. The set of computer readable instructions can include instructions for receiving a set of movement data points from the first solar panel and the second solar panel, storing the set of movement data points in non-volatile memory, and actuating the transceiver if a number of movement data points in the set of movement data points exceeds a pre-determined number of a set of minimal data points. The set of computer readable instructions can include instructions for determining if the number of movement data points exceeds a pre-determined number of minimal data points upon expiration of a timer.

The set of computer readable instructions can include instructions for determining is there is no change in the power from the first solar panel representing to the microprocessor that there has been no movement detected by the first solar panel and the second solar panel for a predetermined period of time. Determining if there has been a change in the power delivered from the first solar panel to the microprocessor and associating this change with movement. The set of computer readable instructions can include instructions for normalizing movement data received from the first solar panel and the second solar panel and determining baseline for an ambient condition of first solar panel and the second solar panel and determining movement within the first sensor area and the second sensor area when compared to the baseline.

The batteryless, self-powered sensor can comprise: a microprocessor in electronic communications with a solar array adapted to provide power to the microprocessor; a solar panel included in the solar array having a sensing area wherein energy produced by the solar panel is reduced when an object passes into the sensing area; a set of computer readable instructions included in the microprocessor adapted for creating a data set according to a determination of movement of an object within the sensing area; and, a transceiver in electronical communication with the microprocessor adapted to transmitting the data set to a remote location. The solar array and the set of computer readable instructions can be cooperatively adapted to determine a direction and a speed of movement of the object within the sensing area. The set of computer readable instructions can include instructions for reducing power delivered from the solar array to the microprocessor if there has been no movement detected for a predetermined period of time and increasing power delivered from the solar array to the microprocessor if movement is detected by the solar array.

The housing can be configured to carry the various components of the sensor, including magnets, or other materials or structures adapted to allow the housing to be removably attached to a support surface.

The system can include a sensor that can be removably attached to a passageway or door (e.g. door frame or ceiling facing downward) and can include one or more solar panels. A first solar panel can face in an inward direction and a second solar panel can face in an outward direction. The system can include a detector circuit, a microcontroller, and a radio. The solar panels can harvest ambient light reflecting off the floor to power the sensor. When an object or person comes within a certain proximity to a sensor, the object or person blocks some of the light to the sensor and changes the amount of power that is harvested by the sensor. The detector circuit can monitor the energy harvested and can signal the microcontroller whenever the voltage changes rapidly. The microcontroller then transitions from a sleep mode (e.g. energy saving mode) to a wake mode (e.g. active/operational mode) and monitor the output from the inward and outward solar panels. The output from the solar panels can be used to determine the activity that occurred due to the object or person. For example, activity can include detecting motion and additional activity such as the ability to distinguish between walking into a room and walking out of a room, moving through a doorway empty handed, and with an object such as a cart, handheld items, totes, bags, and the like. The energy difference that is detected by the microprocessor and provided from a solar panel or solar array can be used to determine the motion and any associated items.

The angling of the solar panels can allow the sensor to determine motion vectors, speed, acceleration, and can eliminate "false positives." In testing, test subjects interacted with doorways, wherein the test subjects were of variable heights, clothing, hair color, and walking speeds. In one embodiment, the sensor system was able to detect doorway events and direction with greater than 95% accuracy under typical indoor lighting conditions. In one test, the sensor is batteryless and requires less than 18 µA of current. The sensor can operate with less than 5 µA in one configuration.

The system can be cooperatively integrated, connected to, in communication with or operationally associated with existing smart building system. For example, the system could be configured to turn off unneeded lights and reduce HVAC usage in unoccupied space. It could also provide useful information about how facilities and buildings are currently used for planning purposes (e.g. the identification of overused and underused areas).

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail.

Figure 1A:
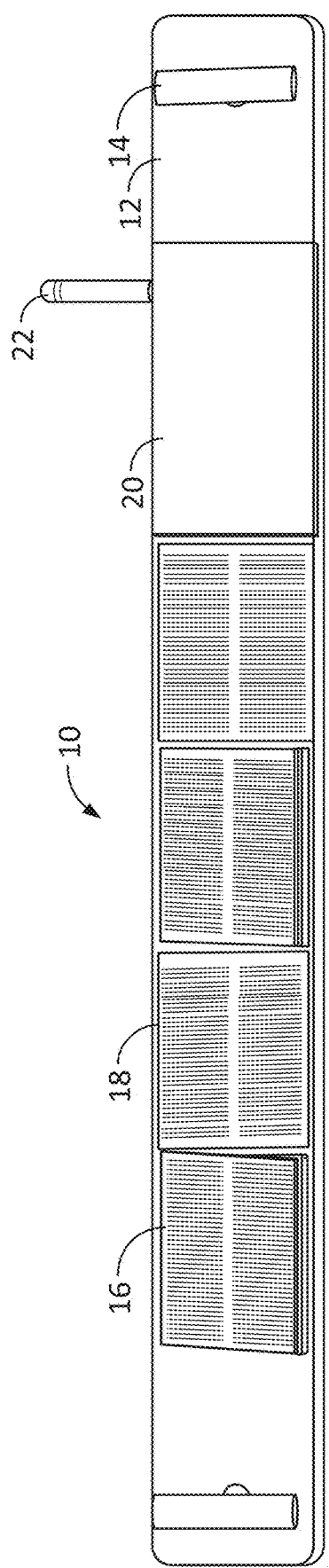
FIGS. 1A and 1B are diagrams of aspects of the system.
Figure 1B:
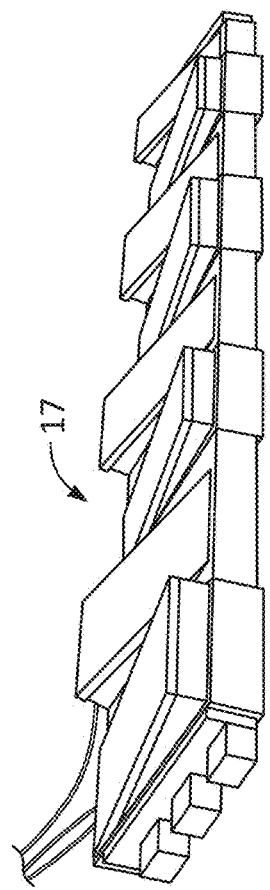

Referring to FIGS. 1A through 1B, the batteryless sensor assembly 10 is shown with a housing 12 and handles 14. A first solar panel 16 and a solar panel 18 can be included in a solar array 17. The solar panels can function as a sensor, power source or both in combination. The solar array or solar panels can include photovoltaic material that can absorb light and generate energy wherein the energy can be electricity. The amount of energy generated can vary according to the light received by the photovoltaic material. Energy collected from the solar panels can be stored within the capacitors on a microcontroller 20 that can be included in the housing. The microcontroller can be a circuit board that can include an ultra-low power processor having computer readable instructions stored on a computer readable medium adapted to provide for a sleep mode and fast wake-up mode. The microcontroller can also contain a sub-1 GHz low power transceiver for transmitting data to a remote source. The microcontroller 20 can be carried by the housing and include a transceiver with antenna 22 for sending information to and from a remote location.

The housing can be removable affixed to a support surface such as the top of a door jamb, wall, ceiling, or the like to support the housing. Magnets (not shown) can be attached to a rear side of the housing adapted to removably affix the housing to a support surface. The solar array can be attached to a front side of the housing.

Figure 2A:
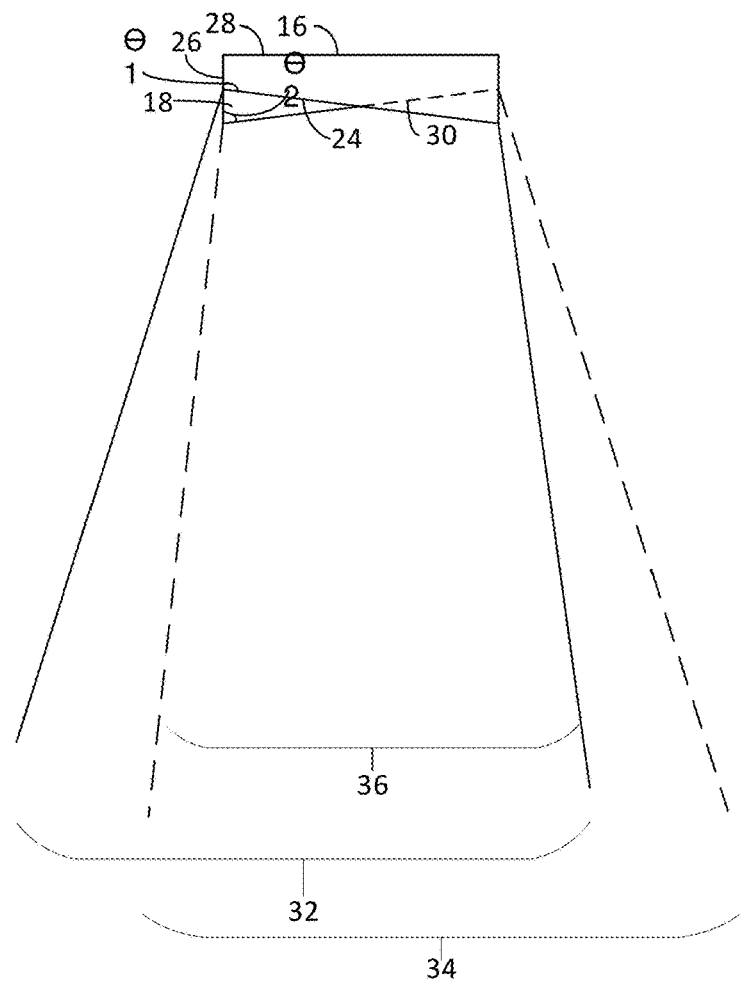
FIGS. 2A 2B and 2C are schematics of aspects of the system.
Figure 2B:
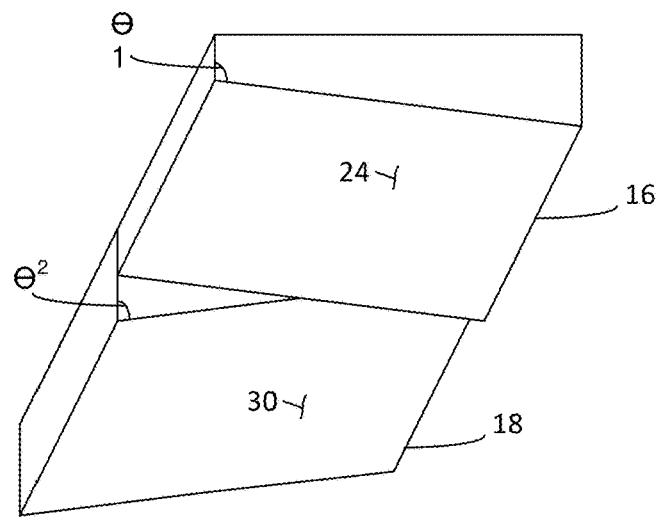
Figure 2C:
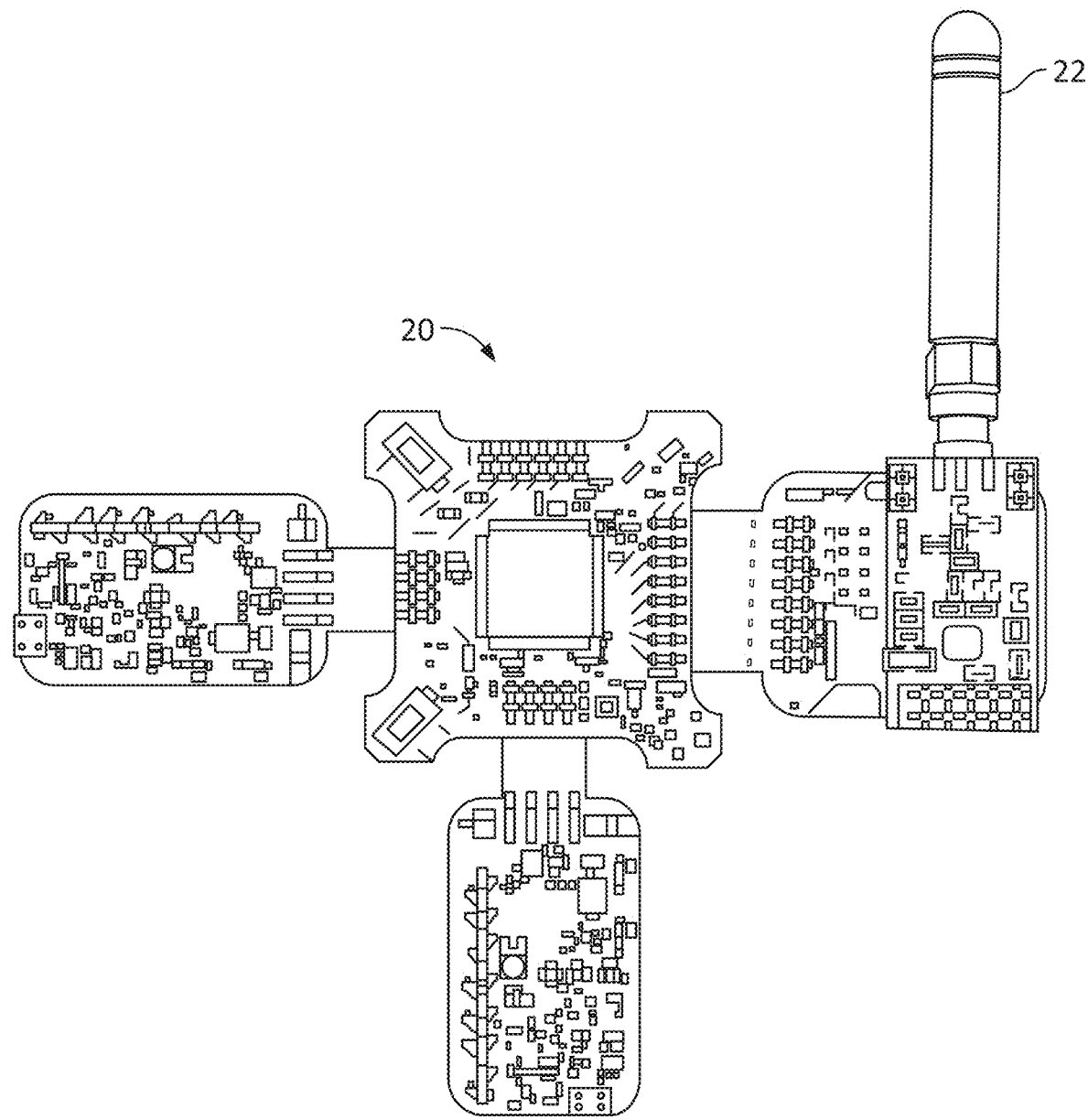

Referring to FIGS. 2A 2B and 2C, the first solar panel 16 can be disposed at a first angle $\theta^1$ defined between a vertical side 26 perpendicular to a rear side 28 of the solar panel, side of the housing, support surface or door jamb and the front surface 24 of the first solar panel. A second solar panel 18 can be disposed at a second angle $\theta^2$ defined between a vertical side 26 perpendicular to a rear side 28 of the second solar panel side of the housing, support surface or door jamb and the front surface 30 of the second solar panel. Angle $\theta^1$ can be less than 90° and angle $\theta^2$ can be greater than 90°. Angle $\theta^1$ can be less than angle $\theta^2$. A first solar panel area 32 can be associated with the first solar panel and a second solar panel area 34 can be associated with the second solar panel. The first solar panel area and the second solar panel area can have an overlapping area 36. When an object passes through a solar panel area, the light exposed to the solar panel is varied resulting in a variation of the energy generated by the solar panel. The variation on the energy generated by the solar panel can be detected by the microcontroller and the variation of the energy generated by the solar panel can be used as input to the computer readable instructions. The computer readable instructions can interpret the variation in the energy generated by the solar panel to correspond to a physical object passing through the solar panel area.

Figure 3:
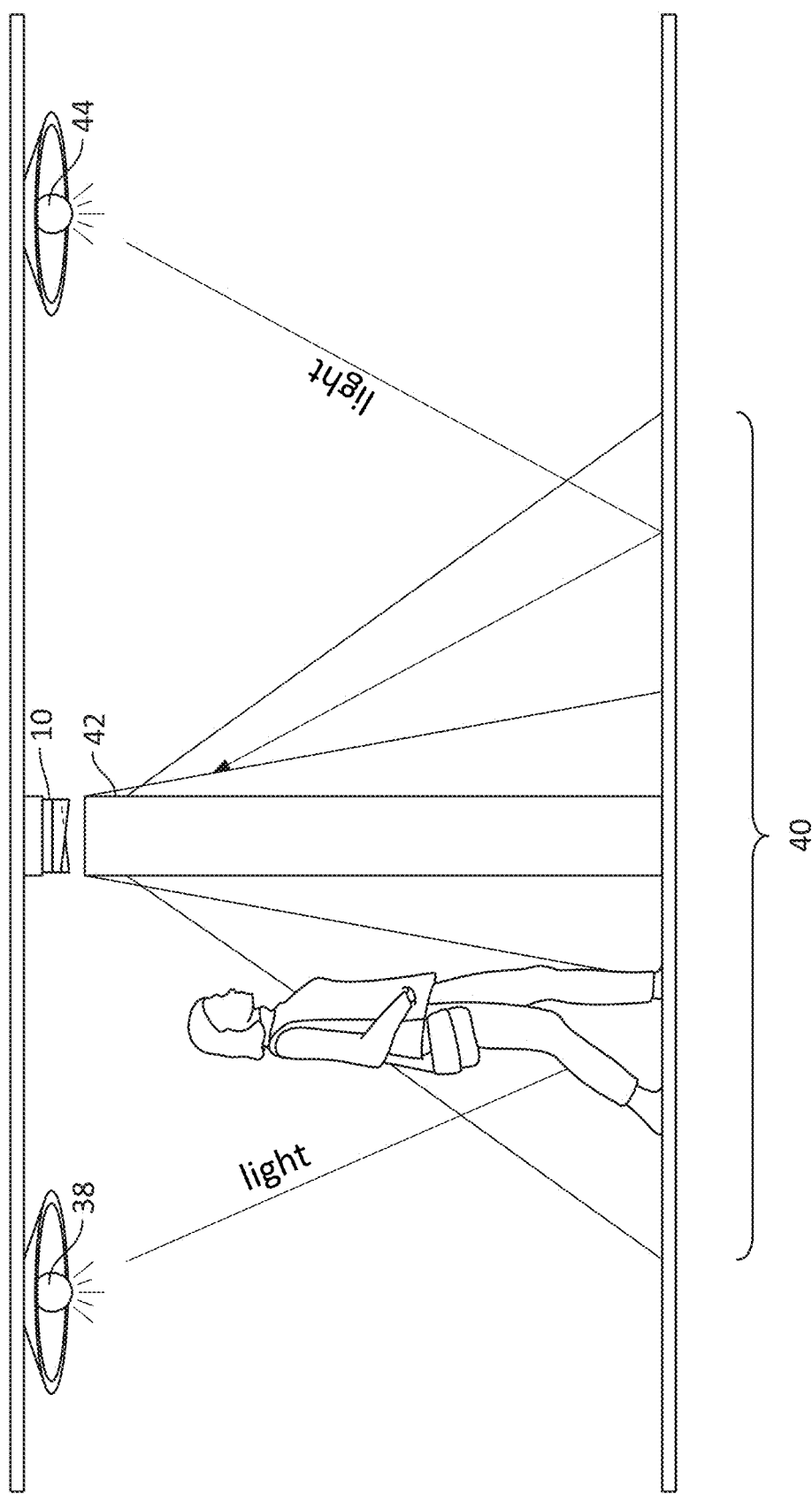
FIG. 3 is a schematic of aspects of the system in an application.

Referring to FIG. 3, a first light source 38 can be disposed on one side of an area 40, such as an area having a doorway 42. The batteryless sensor assembly 10 can be disposed at the top of the doorway such as in the door jamb. A second light source 44 can be disposed in the area 40 such as on the other side of the doorway 42. When light from the first light source is present, the light can be detected by the first and second solar panels in their respective solar panel areas. When an object fully or partially obstructs the light source, the light in the first solar panel area or the second solar panel area or both is varied including being reduced. If the object is passing through the doorway, in this example, the object will reduce the light present in the first solar panel area, then the overlapping solar panel area, then the second solar panel area. Therefore, the energy generated by the first solar panel will be reduced followed by the energy generated by the second solar panel being reduced. As the object passes through the solar panel area, the object will cease obstructing the light and the light in the solar panel area will return to ambient light and the energy production of the solar panel will return to the level before the object passed through the solar panel area.

The solar panels, in converting light to electricity, in one example, can detect and report that the electricity from one or more solar panels is reduced representing lower light in the solar panel which can represent an object passing through the solar panel area. The housing can also include sensors that can detect variation on the light so that the microcontroller can determine when an object passes through the sensors are associated with the sensor. If sensors are photovoltaic, then the sensor can also harvest the light entering the sensor area and convert the light to energy. Further, the solar panel or the sensor can determine if an object travels across the doorway and not just through the doorway.

Figure 4C:
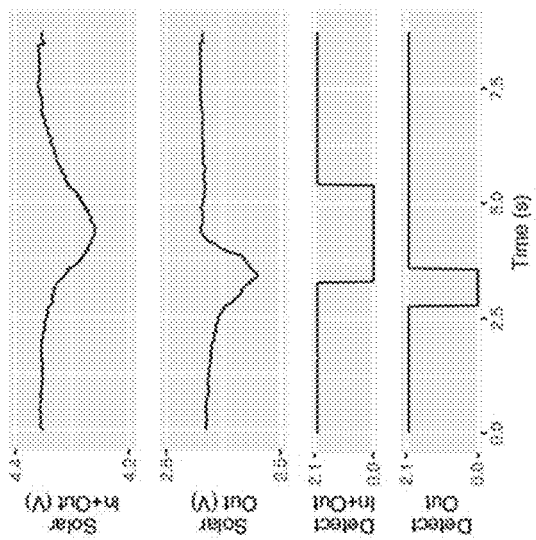
FIG. 4A through 4C are representations of outputs of the system.
Figure 4B:
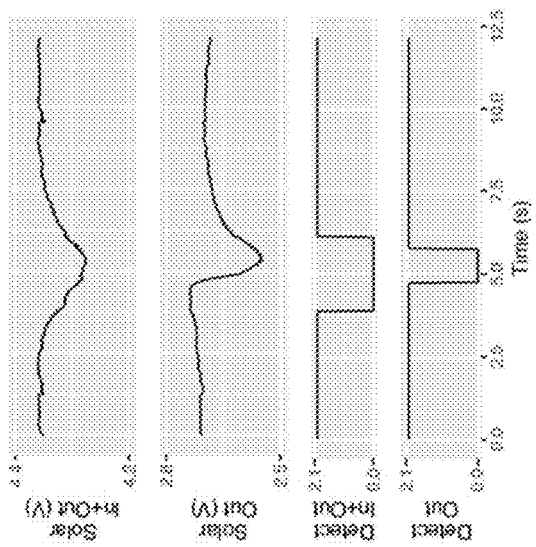
Figure 4A:
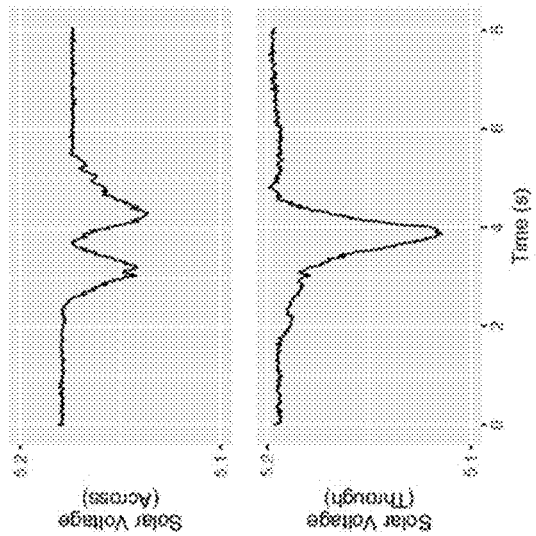

Referring to FIGS. 4A through 4C, examples of output when an object passes through the solar panel or sensor areas. The top panel of FIG. 4A provides an example of the output when an object travels across the walkway. This output can also represent when an object travels parallel to length of the housing. The lower panel of FIG. 4A provides an example of output when an object travels through a doorway or otherwise travels perpendicular to length of the housing. The top panel of FIG. 4B illustrates the electrical output of a photovoltaic sensor when an object travels in and out of a doorway or otherwise travels perpendicular to length of the housing. The second panel down in FIG. 4B illustrates when an object travels one way through a doorway or otherwise travels perpendicular to length of the housing. The microcontroller can convert the electrical output of the photovoltaic sensor into a digital output representing the movement of the object. The third panel down of FIG. 4B represents the detection of an object that travels in and out of a doorway or otherwise travels perpendicular to length of the housing. The lowest panel in FIG. 4B illustrates when an object travels one way of a doorway or otherwise travels perpendicular to length of the housing. FIG. 4C illustrates the same electrical output of one or more solar panels and detection represented in FIG. 4B, except that the object is traveling in the opposite direction.

Figure 5:
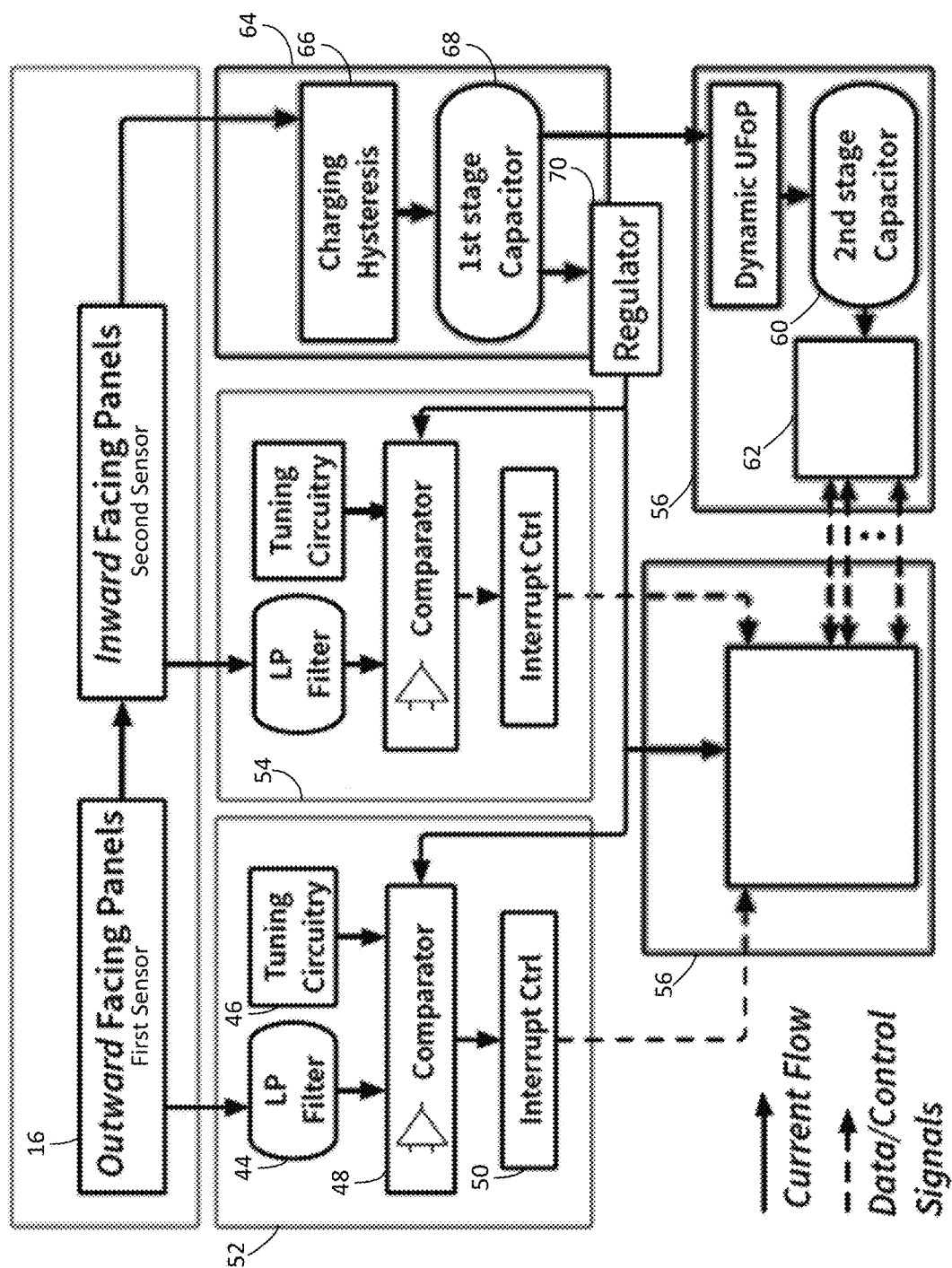
FIG. 5 is a diagram of components of the system; and,
FIG. 6 is a flowchart of aspects of the operation of the system.

Referring to FIG. 5, the operation of the batteryless sensor assembly is shown. The first solar panel 16 or sensor can be connected to a first circuit 52 that can include a first filter 44, such as a low pass filter, first tuning circuit 46, first comparator 48, and interrupt controller 50. The filter can be used to determine if an object has passed into a solar panel or sensor according to the electrical output of the solar panel or photovoltaic sensor. The tuning circuit can be used to generate an output of a particular frequency to account for the ambient light and the detection of an object according to the electrical output of the solar panel or photovoltaic sensor while minimizing electrical resistance to increase efficiency when using the output of the solar panel to power a component of the assembly such as the first circuit. The comparator can be used to compare different voltages of the electrical output of the solar panel or photovoltaic sensor and determine a binary output representing the detection of an object passing in proximity to one or more solar panels or sensors. For example, the comparator output can be represented as follows:

$$V_0 \begin{cases} 1, \text{ if } V_+ > V_- \\ 0, \text{ if } V_+ < V_- \end{cases}$$

In the above equation, $V_0$ stand for the comparator output where $V_+$ is the energy generated by the solar panel with no interference of the light exposed to the solar panel (e.g. ambient light) and $V_-$ is the energy generated by the solar panel when an object passes in the solar panel area and interrupts (e.g. reduces) the energy generated by the solar panel.

The interrupt controller can be used to combine the output from several solar panels into a single value to determine object proximity or movement using multiple solar panels, but one processor. The second circuit 54 can include the same or similar components to that of the first circuit with the same or similar functionality. A processor 56 can be included with the first and second circuits. The processor can include an ultra-low powered microcontroller with computer readable instructions, programmable, on the microprocessor, configured to receive analog and/or digital inputs. The microprocessor can include non-volatile memory with lower active power consumption during read and write cycles. For example, the memory can be a ferroelectric random-access memory configured to store data even when powered off.

A transceiver 58 can be in communication with the processor for sending and receiving data from remote sources. The transceiver can include a radio 62 in communication with the processor to receive and transmit data. The transceiver can include a capacitor 60 that can be used to store energy from the sensors. The transceiver can include a transceiver controller configured to determine if a sufficient change is available in the capacity for operation of the transceiver, if so, activate the transceiver and transmit data. By using capacitance storage individualized to the transceiver, the determination when to activate the transceiver according to power available can be more accurate and significantly less effected by the power usage of other components in the system. Further, power modeling is not necessary, as the determination of when to activate the transceiver is based upon actual power available, not on a theorical determination.

Power from the solar panels or sensors can be transmitted to a charging module 64 that can include charging computer readable instructions 66 to deliver power to a charging capacitor 68 and regulator 70. The regulator can deliver power to the microprocessor and transceiver as appropriate according to the charging computer readable instructions. In FIG. 5, the solid flow lines represent the flow of power while the dotted flow lines represent the communication paths of data.

Figure 6:
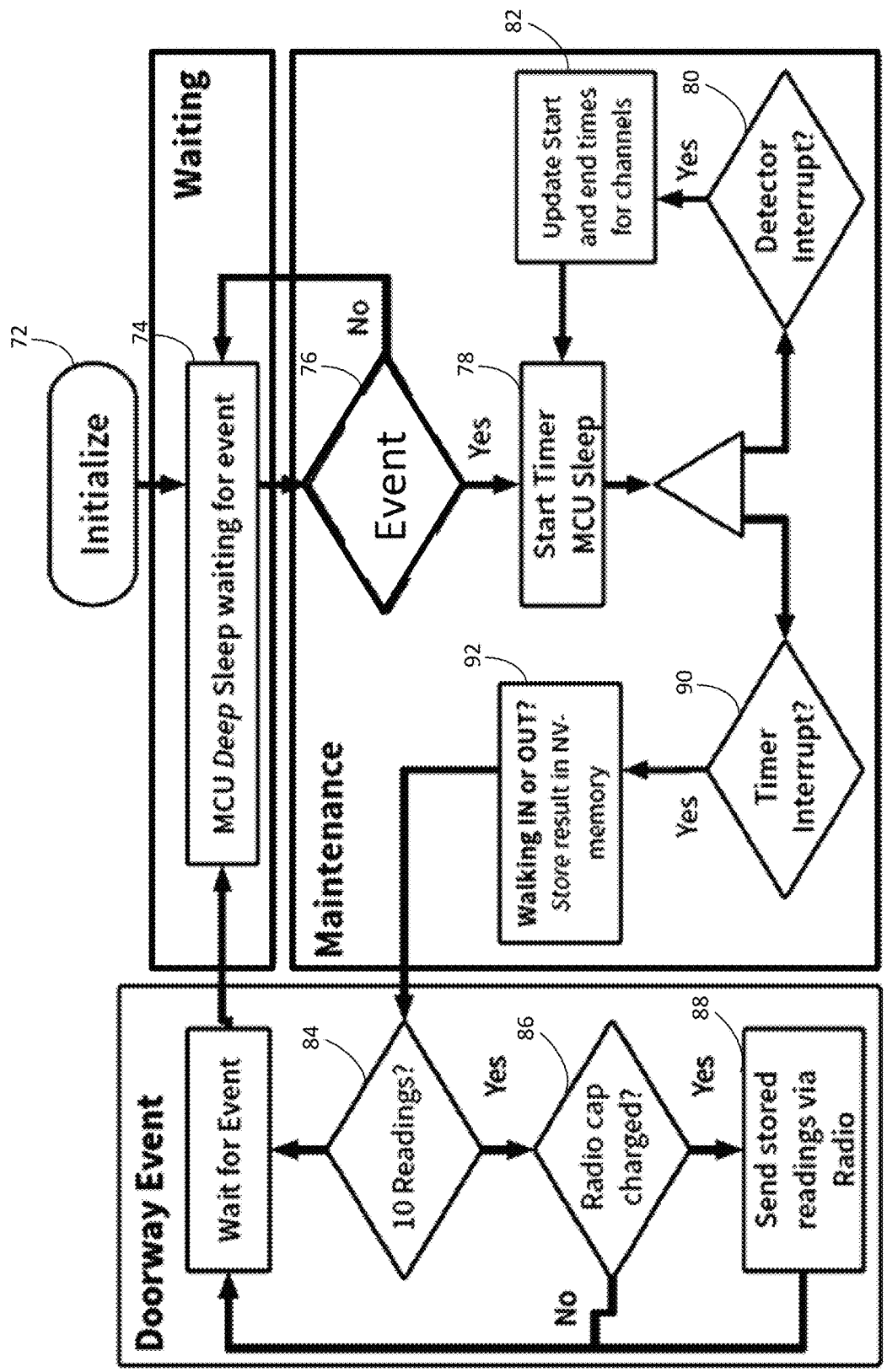

Referring to FIG. 6, the structure and function of the system in operation is further described. The system and the computer readable instructions can be initialized at 72. The microprocessor can be in a low power mode at 74 in anticipation of an event to occur. If an event is detected at 76, a timer 78 can be initiated. If the event was the result of a detection of an object at 80, the start and end times for the solar panel or sensor can be updated at 82 and the process returned to step 78. If the event is a detector, the process may also continue to step 84 where the decision is made if a predetermined number of readings from the solar panel or sensors have been stored. In one example, the number can be in the range of 5-20 readings. If the number of readings that are made and stored in the microprocessor memory exceed the predetermined number of readings, then a determination at 86 can be made as to whether there is sufficient power to activate the transceiver at 86. If sufficient power is available, the data can be transmitted at 88.

If the event is the expiration of a certain amount of time determined at 90, the process can take the reading from the solar panel or sensor and can store these in the memory of the microprocessor at 92 and continue to 84.

Computer readable instructions, when executed by a processor, cause the processor to perform a series of steps to accomplish a specific task and results in useful, concrete, and tangible results. These computer readable instructions can be tied to a particular machine or apparatus with the specific purpose of executing the computer readable code for accomplishing tangible results and represents and accomplishes the manipulation of physical data.

The detailed description wherein may be presented in terms of program procedures executed on a microcomputer, microprocessor, computer, or network of computers. These procedural descriptions are representations used by those skilled in the art to most effectively convey the substance of their work to others skilled in the art. These procedures herein described are generally a self-consistent sequence of steps leading to a desired result when executed by a microprocessor representing or resulting in the tangible manipulation of physical objects. These steps also require physical manipulations of physical quantities such as electrical or magnetic physical elements and are capable of being stored, transferred, combined, compared, or otherwise manipulated readable medium that is designed to perform a specific task or tasks. Actual computer or executable code or computer readable code may not be contained within one file or one storage medium but may span several storage mediums. The term "host" and "server" may be hardware, software, or combination of hardware and software that provides the functionality described herein.

The present invention is described below with reference to a flowchart, illustrations of methods, apparatus ("systems") and computer program products according to the invention. It will be understood that each block of a flowchart illustration can be implemented by a set of computer readable instructions or code.

Elements of the flowchart support combinations of means for performing the special functions, combinations of steps for performing the specified functions and program instruction means for performing the specified functions. It will be understood that each block of the flowchart illustrations can be implemented by special purpose hardware-based systems that perform the specified functions, steps, or combinations of special purpose hardware or computer instructions.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A batteryless, self-powered sensor comprising:
   housing attached to a support surface;
   a microprocessor included in the housing;
   a first solar panel adapted for receiving light from a first sensing area associated with the first solar panel and in electronic communication with the microprocessor adapted to provide power to the microprocessor;
   a capacitor in communications with the microprocessor for storing energy received from the first solar panel;
   a second solar panel adapted for receiving light from a second sensing area associated with the second solar panel and in electronic communication with the microprocessor;
   a transceiver in communications with the microprocessor; and
   a set of computer readable instructions included in the microprocessor adapted for creating motion data including a direction and a speed of movement of object within the first sensing area associated with the first solar panel and the second sensing area associated with the second solar panel according to a reduction in light reaching the first sensing area relative to the second sensing area according to an obstruction caused by an object moving through the first sensing area, transmitting the motion data to a remote location if sufficient power is available to the transceiver and a number of data points in the motion data exceeds a pre-determined number of minimal data points, associating a reduction in power delivered from the first solar panel to the microprocessor with movement and associating an increase in power delivered from first the solar panel to the microprocessor with movement.

2. The sensor of claim 1 wherein the set of computer readable instructions include instructions for normalizing movement data received from the first solar panel and the second solar panel and determining a baseline for an ambient condition of the first solar panel and the second solar panel.

3. The sensor of claim 2 wherein the set of computer readable instructions include instructions for determining movement within the first sensing area associated with the first solar panel and a second sensor area associated with the second solar panel when compared to the baseline.

4. The sensor of claim 1 wherein the first sensing area is disposed on a first side of a doorway and the second sensing area is disposed on a second side of the doorway.

5. A batteryless, self-powered sensor comprising:
   a microprocessor;
   a first solar panel having a first sensor area and in electronic communications with the microprocessor adapted to provide power to the microprocessor;
   a second solar panel having a second sensor area and in electronic communications with the microprocessor;
   a transceiver in communication with the microprocessor; and a set of computer readable instructions included in the microprocessor adapted for creating motion data including a direction and a speed of movement of object within the first sensing area associated with the first solar panel and the second sensing area associated with the second solar panel according to a reduction in light reaching the first sensing area relative to the second sensing area according to an obstruction caused by an object moving through the first sensing area, transmitting the motion data to a remote location if sufficient power is available to the transceiver and a number of data points in the motion data exceeds a pre-determined number of minimal data points, associating a reduction in power delivered from the first solar panel to the microprocessor with movement and associating an increase in power delivered from first the solar panel to the microprocessor with movement.

6. The sensor of claim 5 wherein the set of computer readable instructions includes instructions for associating movement of an object in the first sensing area when energy produced by the first solar panel is reduced.

7. The sensor of claim 5 including a capacitor in communications with the microprocessor for storing energy received from the first solar panel.

8. The sensor of claim 5 wherein the first solar panel includes a photovoltaic cell.

9. The sensor of claim 5 wherein the set of computer readable instructions include instructions for determining a direction of movement of the object relative to the first solar panel and the second solar panel.

10. The sensor of claim 5 wherein the set of computer readable instructions include instructions for determining a speed of movement of the object.

11. The sensor of claim 5 wherein the set of computer readable instructions include instructions for determining if sufficient power is provided by the first solar panel to actuate the transceiver.

12. The sensor of claim 5 including a non-volatile memory in communications with the microprocessor for storing the data set received from the first solar panel and the second solar panel.

13. The sensor of claim 12 wherein the set of computer readable instructions include instructions for receiving a set of movement data points from the first solar panel and the second solar panel, storing the set of movement data points in the non-volatile memory, and actuating the transceiver if a number of movement data points in the set of movement data points exceeds a pre-determined number of a set of minimal data points.

14. The sensor of claim 13 wherein the set of computer readable instructions include instructions for determining if the number of movement data points exceeds a pre-determined number of minimal data points upon expiration of a timer.

15. The sensor of claim 5 wherein the set of computer readable instructions include instructions for associating a reduction of power delivered from the first solar panel to the microprocessor with movement associated with the first solar panel and the second solar panel if a reduction in power occurs for a predetermined period of time.

16. The sensor of claim 5 wherein the set of computer readable instructions include instructions for associating an increase in power delivered from the first solar panel to the microprocessor with movement associated with the first solar panel and the second solar panel.

17. The sensor of claim 5 wherein the set of computer readable instructions include instructions for normalizing movement data received from the first solar panel and the second solar panel and determining a baseline for an ambient condition of first solar panel and the second solar panel.

18. The sensor of claim 17 wherein the set of computer readable instructions include instructions for determining movement motion within the first sensor area and the second sensor area when compared to the baseline.

19. The sensor of claim 5 including a transceiver in electronical communication with the microprocessor adapted to transmitting the data set to a remote location.

20. A batteryless, self-powered sensor comprising:
a microprocessor in electronic communications with a solar array adapted to provide power to the microprocessor;
a first solar panel adapted for receiving light from a first sensing area associated with the first solar panel and electronic communication with the microprocessor adapted to provide power to the microprocessor; a second solar panel adapted for receiving light from a second sensing area associated with the second solar panel and in electronic communication with the microprocessor; a transceiver in communications with the microprocessor; and a set of computer readable instructions included in the microprocessor adapted for creating motion data including a direction and a speed of movement of object within the first sensing area associated with the first solar panel and the second sensing area associated with the second solar panel according to a reduction in light reaching the first sensing area relative to the second sensing area according to an obstruction caused by an object moving through the first sensing area, transmitting the motion data to a remote location if sufficient power is available to the transceiver and a number of data points in the motion data exceeds a pre-determined number of minimal data points, associating a reduction in power delivered from the first solar panel to the microprocessor with movement and associating an increase in power delivered from first the solar panel to the microprocessor with movement.

21. The sensor of claim 20 including wherein the solar array and the set of computer readable instructions are cooperatively adapted for determining a direction and a speed of movement of the object within the sensing area.

22. The sensor of claim 20 wherein the set of computer readable instructions include instructions for associating a reduction in power delivered from the solar array to the microprocessor with movement when a reduction of power is for a predetermined period of time and associating an increase in power delivered from the solar array to the microprocessor with movement.

* * * * *